July 22, 1952 H. I. F. EVERNDEN 2,603,943
ROTARY HYDRAULIC TORQUE CONVERTER
Filed Sept. 24, 1946 2 SHEETS—SHEET 1

Inventor
Harold I. F. Evernden
by Wilkinson & Mawhinney
Attorneys

Patented July 22, 1952

2,603,943

UNITED STATES PATENT OFFICE 2,603,943

ROTARY HYDRAULIC TORQUE CONVERTER

Harold Ivan Frederick Evernden, Hazlewood, Duffield, near Derby, England, assignor to Rolls-Royce Limited, Derby, England, a British company Application September 24, 1946, Serial No. 698,988
In Great Britain November 3, 1944

Section 1, Public Law 690, August 8, 1946
Patent expires November 3, 1964

3 Claims. (Cl. 60—19)

This invention is for improvements in or relating to control means for variable-speed power-transmission mechanisms of the kind comprising a hydraulic torque-converter and an epicyclic reversing gear, with a brake and a clutch for controlling such gear.

An important object of this invention is to provide a mechanism of the kind described which has hydraulically controlled brakes and clutches for controlling the torque-converter and the epicyclic gear, wherein one operating liquid is used for all the brakes and clutches and for operating an automatic control, which controls the engagement of a clutch between two of the rotating members of the torque-converter in accordance with the throttle-setting of the power unit driving the mechanism and with the speed of the output-shaft of the mechanism.

According to a feature of this invention the control means may comprise a hydraulically operated clutch which is supplied through a hydraulically operated shift valve, a centrifugally controlled valve, driven at a speed proportional to that of the output shaft of the torque converter, in the hydraulic line supplying said shift valve, a spring loading for said shift valve, an adjustable abutment for said spring, and means coupling said abutment to the throttle-control pedal or lever of the power unit.

Figure 1:
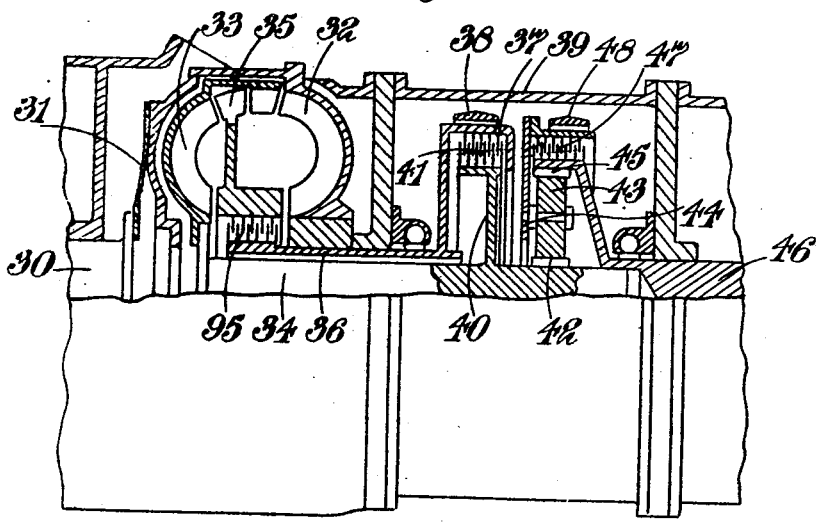
Figure 2:
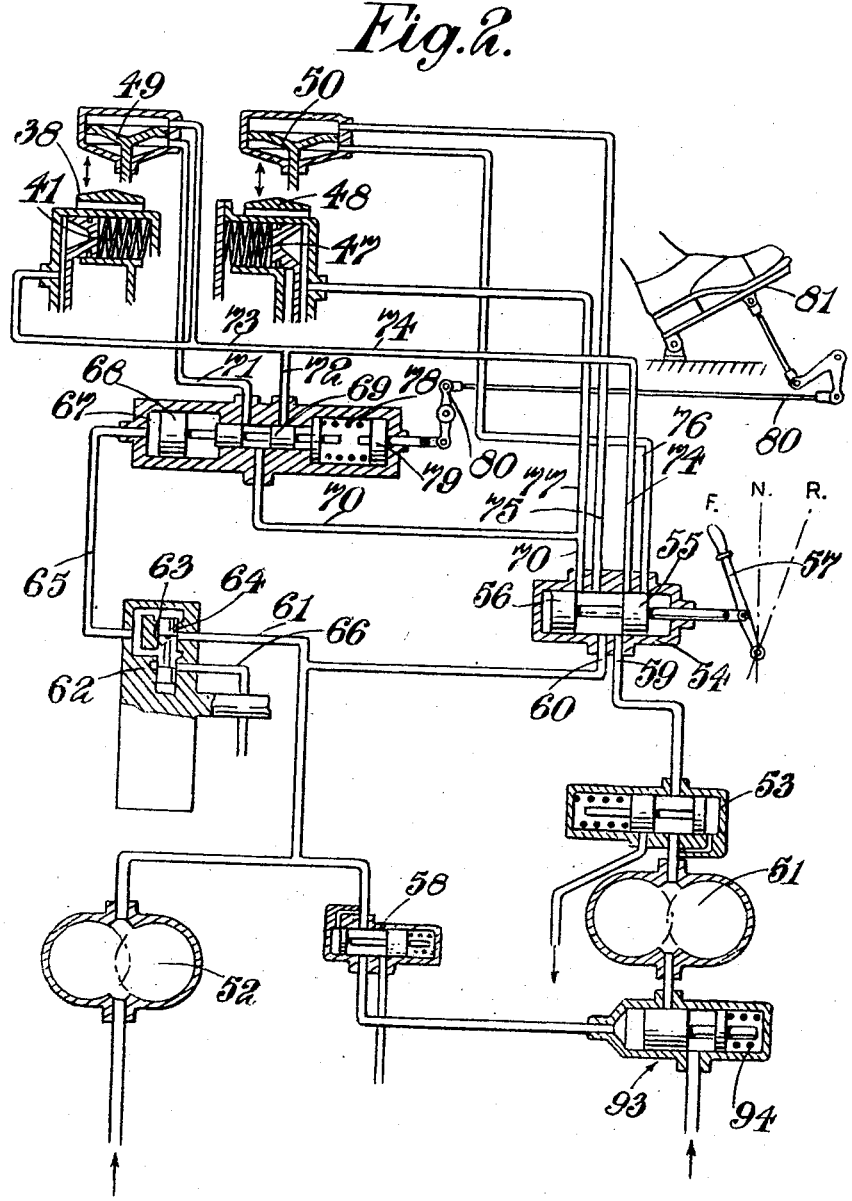

In the accompanying drawings,

Figure 1 is a part sectional view showing more or less diagrammatically the application of this invention to one type of torque-converter, and Figure 2 shows diagrammatically the hydraulic control system for the mechanism shown in Figure 1.

Referring first to Figure 1, the driving or input shaft for the power-transmission system of a motor vehicle is indicated at 30 and it drives through a flexible coupling 31 the impeller 32 of a hydraulic torque-converter. The driven member or turbo-runner 33 of the torque-converter is mounted on a shaft 34, and the reaction member 35 is mounted through a free-wheel 95 on a shaft 36 carrying a brake drum 37; a brake 38 co-operates with the brake drum to lock it to the casing 39. The shaft 34 aforesaid carries a member 40 which can be engaged by a clutch 41 with the drum 37 aforesaid so as to cause them to rotate together. The shaft 34 also carries a sun-wheel 42 of an epicyclic gear whereof the planets 43 and carried on a planet carrier 44 and engage with an annulus 45 carried on the output shaft 46 of the transmission unit. A clutch 47 is provided for engaging the planet carrier 44 with the annulus 45 and output shaft 46.

In the operation of this device, the neutral setting is obtained by disengaging all brakes and clutches or by engaging either the brake 38 or the clutch 41 so that the reaction member is held stationary, or locked to the turbo-runner 33, and the fluid circulates idly in the torque-converter; the brake 48 and clutch 47 of the epicyclic train 42, 43, 45 are also disengaged. In order to obtain a forward drive through the torque-converter, the brake 38 is engaged so as to hold the reaction member 35 against backward rotation; clutch 47 is also engaged so as to lock the planet carrier 44 to the output shaft 46 to give a solid drive through the epicyclic train from the turbo-runner 33 by way of the shaft 34 and the locked epicyclic train to the output shaft 46. When a sufficiently high speed has been attained, the brake 38 is released and the clutch 41 engaged, and the clutch 47 is maintained in engagement. A fluid coupling drive is thereby obtained direct from the driving shaft 30 to the output shaft 46. The reaction member 35, when the unit is acting as a torque-converter, is held against backward rotation relative to shaft 36 due to a free-wheel 95 which couples it to said shaft 36. On reaching unity torque-conversion ratio (and thereafter) member 35 is permitted by the free-wheel 95 to rotate forwards. When clutch 41 is engaged, member 35 is compelled to travel at the speed of the output runner 33, and the unit functions continuously as a fluid coupling.

The reverse drive is obtained in the usual manner by engaging a brake 48 with the planet carrier 44 so as to render the epicyclic gear train 42, 43, 45 operative to transmit a drive in the reverse direction, the clutch 41 being also engaged to transmit a fluid coupling drive to the sun-wheel 42 of the epicyclic train.

The preferred arrangement of hydraulic control for this transmission mechanism illustrated in Figure 1 is shown diagrammatically in Figure 2.

One feature of the control gear is that the change from a torque-converting drive to a hydraulic coupling drive, can be made to take place automatically in accordance with the relationship between the throttle opening of the power unit and the speed of the output shaft which in this particular example is proportional to the speed of the vehicle.

Referring now to Figure 2 the two brakes 38 and 48 are shown diagrammatically and are operated respectively by hydraulic pistons 49, 50 which are moved upwards by the application of hydraulic pressure to the underside of each piston to apply the brake. Similarly, the two clutches 41 and 47 are engaged by the application of fluid pressure to them when required.

The control mechanism comprises a pump 51 which is driven from the engine, so as to be operable whenever the engine is running whether a drive is being transmitted through the mechanism or not; a second pump 52 is driven from the output shaft or a part associated therewith so as to give hydraulic pressure whenever the vehicle is in motion; the pump 51 delivers oil under pressure through a relief valve 53 to a control valve indicated generally by the reference 54, this valve comprising pistons 55, 56 operated by th driver's control lever 57 which can be set in three different positions designated F, N, R indicating forward, neutral and reverse respectively. The pump 52 is similarly provided with a relief valve 58 and communicates with the casing of the control valve 54 through conduit 60, so that a supply of pressure fluid is delivered to the said valve through the conduits 59 and 60. The conduit 60 also provides communication through the conduit 61 with a centrifugal governor which is illustrated diagrammatically as a rotating casing 62 driven from the output shaft at a speed proportional thereto. The pressure fluid from the pipe 61 is admitted to a valve chamber 63 in which there is a piston valve 64 controlling the flow of liquid therethrough, and directing it either to an outlet pipe 65 or to a sump by the pipe 66. The valve is subjected to centrifugal forces and also on its upper end to the pressure of the liquid in the pipe 65, so that the pressure delivered through the pipe 65 is a function of the speed of the vehicle.

The pipe 65 supplies pressure to a cylinder 67 to operate on a piston 68 which controls a shift valve indicated generally by the reference 69. This valve receives a supply of liquid from the control valve 54 through the pipe 70 and controls communication by the pipe 71 with the hydraulic piston 49 which controls the brake 38 and by the pipes 72, 73 with the hydraulically operated clutch 41. The pipe 73 also communicates by the pipe 74 with the control valve 54. This control valve 54 also controls the admission to pipes 75, 76 which communicate with the hydraulic piston 50 controlling the brake 48; the pipe 70 from the control valve 54 also has a connection 77 leading to the hydraulically operated clutch 47.

The shift valve 69, which constitutes an important feature of this invention, is controlled as above described by the pressure-fluid delivered to it through the pipe 65, but is also controlled by a spring 78 which normally presses the valve against the action of the pressure on the piston 68 and the loading of this spring is variable by means of an abutment 79 which is coupled through the linkage 80 with the driver's control pedal 81 which operates the engine throttle in the usual manner.

When the driver's control lever 57 is in the neutral position pressure-fluid is admitted through the pipe 74, 73 to apply the clutch 41 and to close the inlet to the pipe 70 so that the whole gear rotates freely without transmitting a drive, as above described. For a forward drive, the control lever is moved to the position F thereby setting the valve 55, 56 in the position shown. Communication with the pipe 74 is then cut off, and the pipe 70 is opened, supplying pressure-fluid to the shift valve 69 and also to the clutch 47 to cause it to be engaged. The shift valve 69 being in the position indicated admits the pressure-fluid by the pipe 71 to the piston 49 to apply the brake 38 and in this position a torque-converting drive is transmitted, as above described. As the speed of the vehicle increases and hydraulic pressure is applied to the piston 68, the valve 69 moves towards the right against the action of the spring 78. For any given loading of this spring, that is to say for any given position of the throttle valve, the speed of the vehicle will increase and the pressure on the piston 68 will therefore increase until the vehicle attains a predetermined speed corresponding to the throttle opening, when the valve 69 is moved to close communication with the pipe 71 and open communication with the pipe 72. The brake 38 is thereby released and the clutch 41 is engaged, and since the clutch 47 is already engaged, a fluid-coupling drive is transmitted in the manner above described. It will be seen that the period during which the torque-conversion drive is maintained depends upon the building up of the hydraulic pressure under the control of the governor 62 until the pressure is sufficient to overcome the spring 78, the loading of which is determined by the opening of the engine throttle. In other words for a larger throttle opening, the higher is the speed which must be obtained by the vehicle before the fluid coupling drive is substituted for the torque-converting drive.

The reverse drive is obtained by movement of the driver's control lever 57 to the position indicated at R. This moves the control valve 55, 56 so as to open communication to the pipe 76 and admit pressure-fluid to the hydraulic piston 50 to apply the brake 48 and simultaneously to open the pipe 74 to apply the clutch 41, thereby giving the reverse drive as above described.

It will be seen that by the provision of the two alternative main pumps 51, 52, a supply of pressure-fluid is ensured at all times whether the vehicle is stationary, provided the engine is running, or in motion, even with the engine stopped. It will further be appreciated that when the system is giving a fluid-coupling drive at any speed, depression of the driver's pedal 81 will operate through the spring 78 to readjust the shift valve 79 and give a torque-conversion drive. It will further be noted that when the vehicle is running at a speed above that corresponding to the throttle opening and road conditions, a fluid-coupling engine drive will be maintained until a very low vehicle speed is reached when the centrifugal governor 62 will have lowered the oil pressure operating on the piston 68 of the shift valve and the torque-converting drive will be reinstated. This is a valuable advantage in providing for braking of the vehicle by the engine.

In Figure 2 there is shown a valve, generally indicated by the reference numeral 93, which controls the admission of oil to the engine-driven pump 51 and is moved by oil under pressure from pump 52 to its closed position against spring 94. In this way when pump 52 is functioning pump 51 ceases to pump oil, thereby avoiding the unnecessary heating of the oil which would otherwise take place if pump 51 continuously delivered through its associated relief valve.

I claim:

1. The combination with a hydraulic torque-transmitter comprising a rotatable driving member, a rotatable driven member, a torque-reaction member, a stationary casing, an intermediate member and a one-way clutch between said torque-reaction member and said intermediate member permitting said torque-reaction member to rotate relative to said intermediate member in the same direction as said driving and driven members and preventing said torque-reaction member from rotating relative to said intermediate member in the opposite direction; of a second clutch engageable between said intermediate member and said driven member to connect said intermediate member and said driven member for rotation together regardless of the relative speeds of said intermediate member and said driven member before engagement of said clutch, means to control the operation of said second clutch, a brake between said casing and said intermediate member, and means to control the operation of said brake, said two means being interconnected so that said brake is disengaged when said second clutch is engaged and vice versa.

2. A combination according to claim 1 further comprising an input shaft to said driving member, an output shaft from said driven member, a throttle lever controlling the power transmitted to said input shaft, a speed-sensitive device, a drive connection between said speed-sensitive device and said output shaft, an operative connection between said means to control the operation of said second clutch and said throttle lever and a second operative connection between said means to control the operation of said second clutch and said speed-sensitive device, whereby said second clutch is operated in dependence upon the setting of said throttle lever and the speed of said output shaft.

3. In combination, a power input shaft, a power output shaft; a hydraulic torque-transmitter between said shafts, said transmitter comprising a rotatable driving member, a rotatable driven member, a torque-reaction member, a stationary casing, and intermediate member and a one-way clutch between said torque-reaction member and said intermediate member permitting said torque-reaction member to rotate relative to said intermediate member in the same direction as said driving and said driven members and preventing said torque-reaction member from rotating relative to said intermediate member in the opposite direction; a hydraulically-operated clutch engageable to connect said intermediate member and said driven member for rotation together regardless of the relative speeds of said intermediate member and said driven member before engagement of said clutch; a source of hydraulic pressure; a connection between said source and said hydraulically-operated clutch; a hydraulically-operated shift-valve to control said connection; a conduit to supply hydraulic-operating pressure from said source of pressure to said shift-valve; a centrifugally-operated valve in said conduit and a drive connection between said centrifugally-operated valve and said output shaft, whereby said centrifugally-operated valve is operative to modify the hydraulic pressure acting on said shift-valve to be proportional to the speed of said out-put shaft; a spring acting on said shift-valve to oppose the hydraulic pressure; a throttle lever controlling the power transmitted to said input shaft; and an adjustable abutment for said spring operatively connected with said throttle lever to increase the load of said spring with increase of power transmitted to said power input shaft.

HAROLD IVAN FREDERICK EVERNDEN.

REFERENCES CITED

The following references are of record in the file of this patent:

UNITED STATES PATENTS

| Number | Name | Date |
|---|---|---|
| 1,960,705 | Köchling | May 29, 1934 |
| 2,014,944 | Martyrer et al. | Sept. 17, 1935 |
| 2,037,252 | Martyrer et al. | Apr. 14, 1936 |
| 2,042,189 | Rabe | May 26, 1936 |
| 2,120,896 | Koeppen | June 14, 1938 |
| 2,204,872 | Thompson | June 18, 1940 |
| 2,221,393 | Carnegie | Nov. 12, 1940 |
| 2,293,358 | Pollard | Aug. 18, 1942 |
| 2,298,649 | Russell | Oct. 13, 1942 |
| 2,302,714 | Pollard | Nov. 24, 1942 |
| 2,316,390 | Biermann | Apr. 13, 1943 |
| 2,332,593 | Nutt | Oct. 26, 1943 |
| 2,373,122 | LaBrie | Apr. 10, 1945 |
| 2,397,634 | Voytech | Apr. 2, 1946 |